…

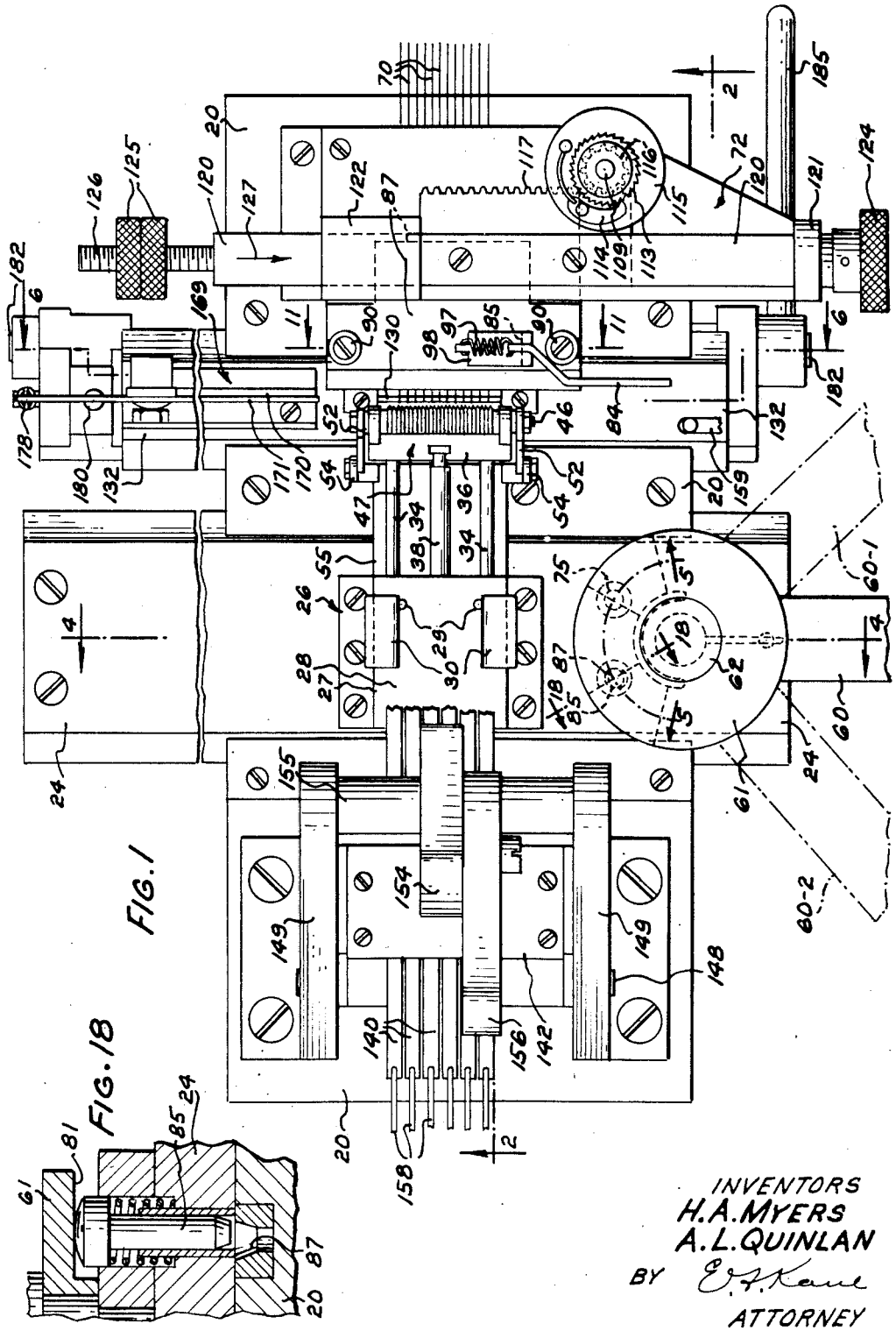

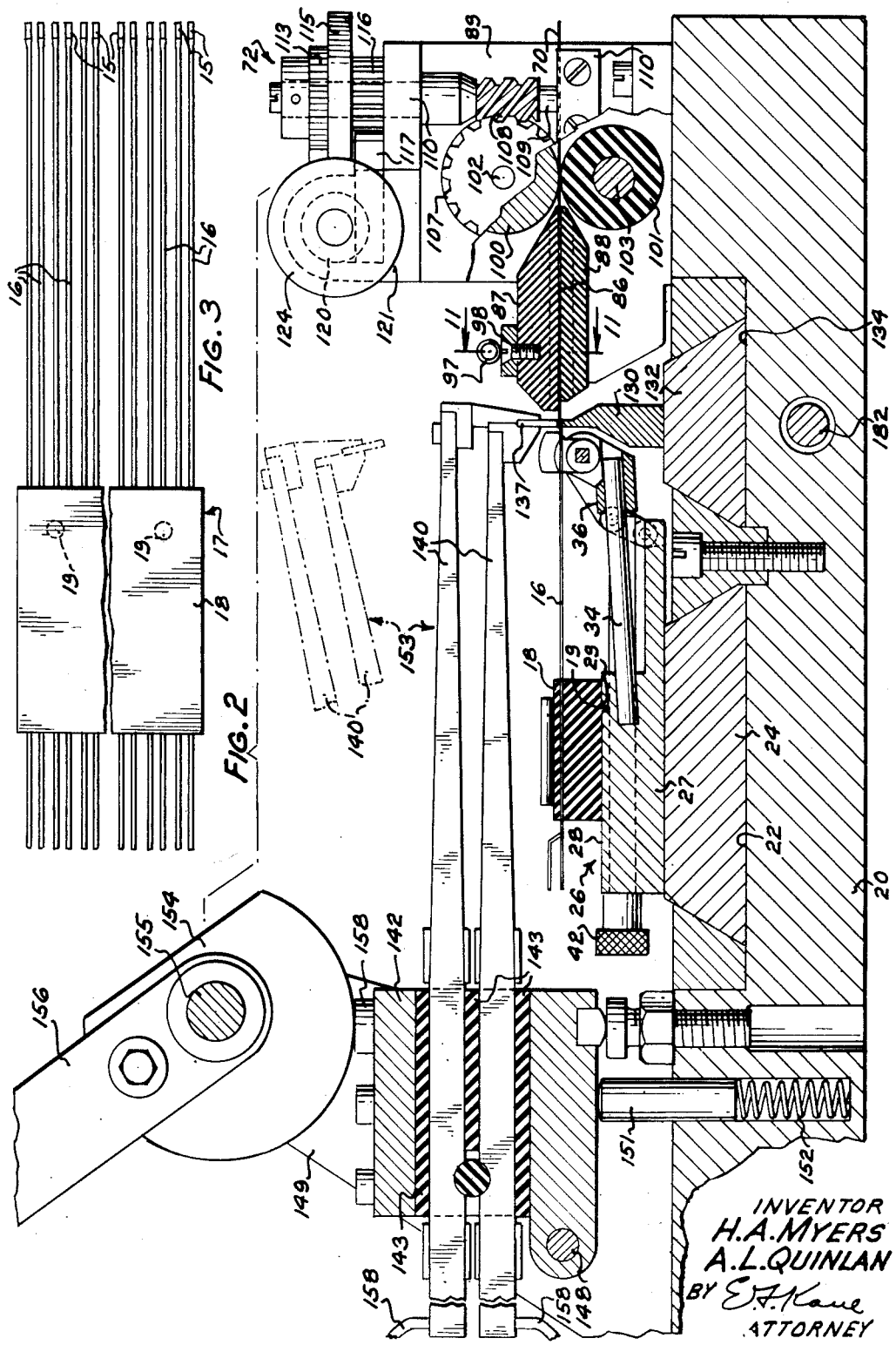

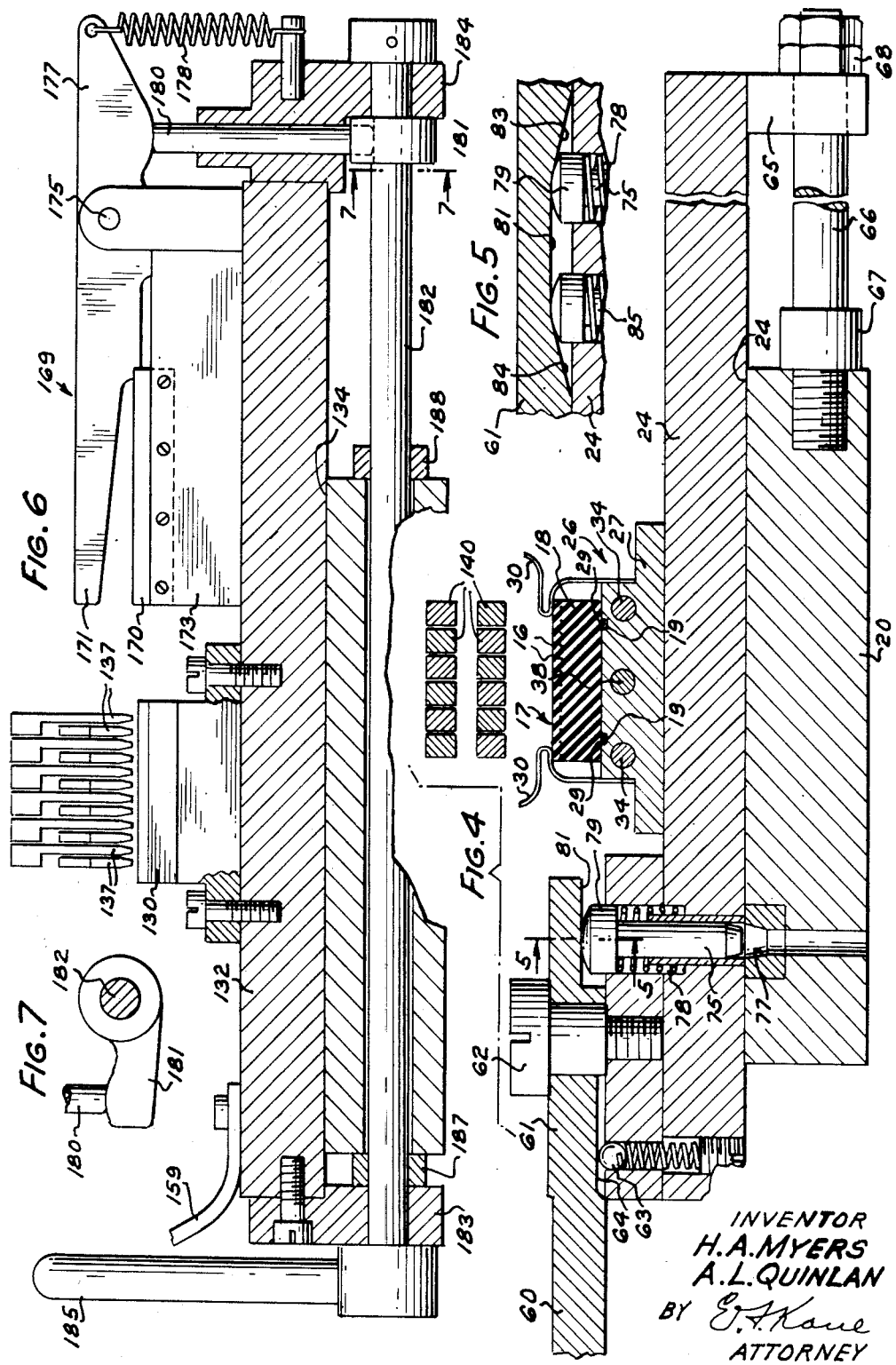

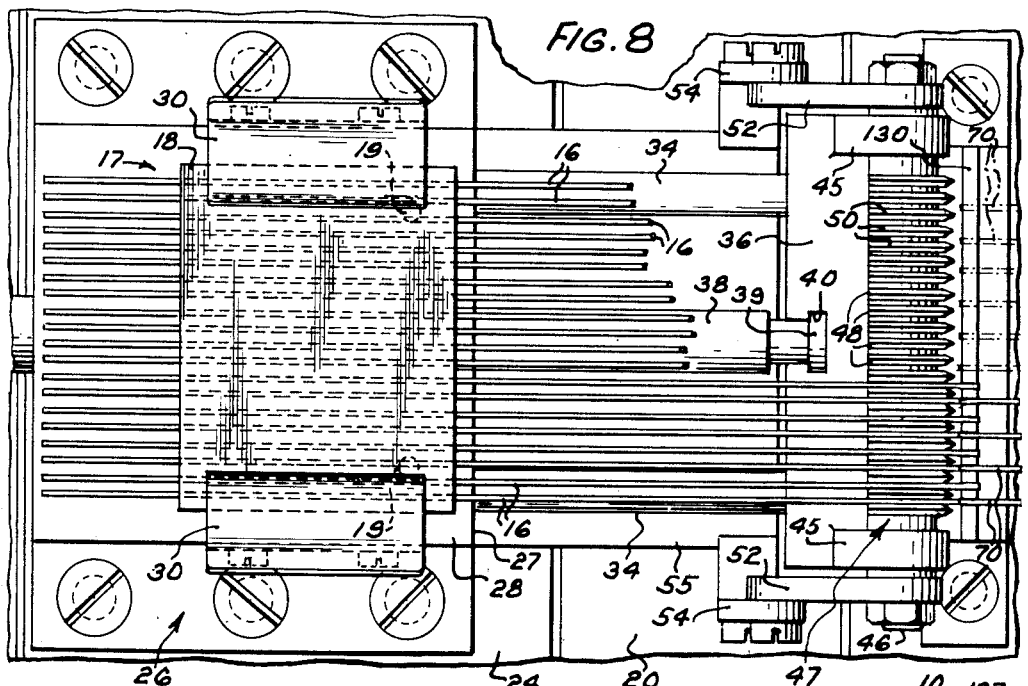
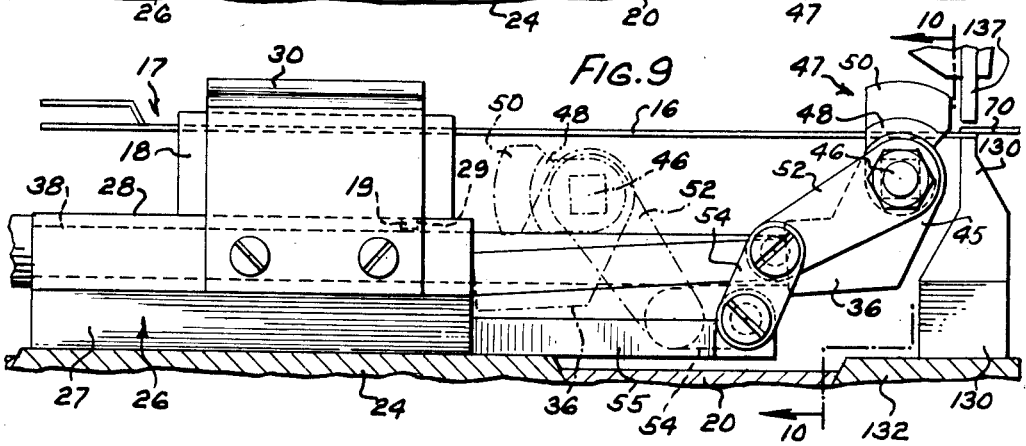
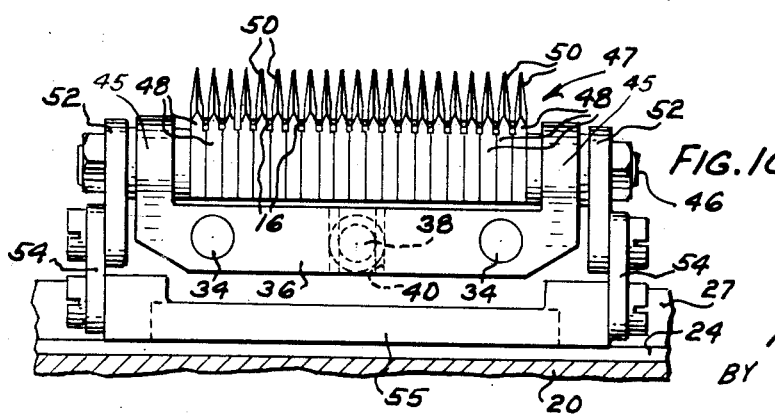

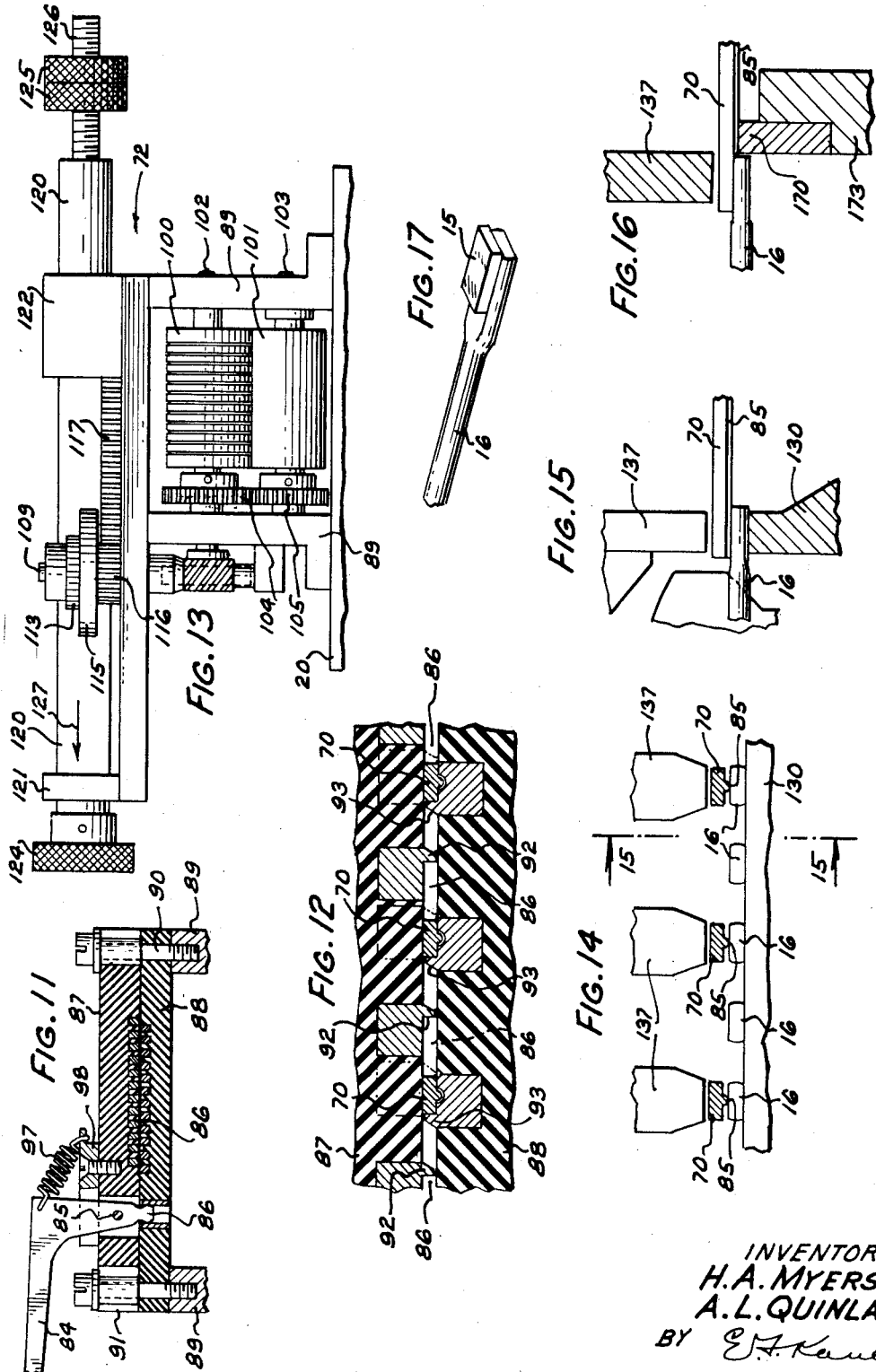

United States Patent Office 2,696,545
Patented Dec. 7, 1954

2,696,545

WELDING APPARATUS

Hubert A. Myers, Hollywood, Calif., and Amos L. Quinlan, La Grange Park, Ill., assignors to Western Electric Company, Incorporated, New York, N. Y., a corporation of New York Application September 10, 1952, Serial No. 308,738

17 Claims. (Cl. 219—4)

This invention relates to welding apparatus and more particularly to an apparatus for welding electrical contacts onto a plurality of spring elements of a relay component.

It is an object of the present invention to provide an improved apparatus for welding contacts onto parts.

It is a further object of the present invention to provide an apparatus for welding contacts onto a plurality of closely positioned pairs of conductor elements of a component of electrical equipment.

The invention contemplates the welding of contacts onto the springs of a relay part having a plurality of pairs of springs by supporting the relay part in a first position with the first one of each pair of the springs in alignment with one of a plurality of tapes of contact material, advancing the tapes to position the ends thereof over the ends of the springs, welding the ends of the tape onto the ends of the springs, severing the welded portion of the contact tapes from the tapes, moving the holder to a second position to align the second spring of each pair of springs with the tapes, advancing the tapes to position the ends thereof over the ends of the springs, welding the ends of the tapes onto the springs, and severing the welded portion of the contact tapes from the tapes.

As illustrative of certain features of the invention, an apparatus for welding contacts onto a plurality of pairs of springs on a relay part may include a holder for supporting the relay part with the ends of the spring on said part in predetermined position, a feeding mechanism for advancing a plurality of tapes arranged in predetermined spaced relation to each other and equal in number to the number of pairs of springs on the relay part, mechanism for moving the holder and the relay part thereon to and from a first and a second position for alternately aligning the first and the second spring of each of the plurality of pairs of the springs with the tapes, a plurality of relatively movable electrodes aligned with the tapes for welding the onto the springs portions of the tapes disposed thereabove, and a cutter for severing from the tapes the end portions thereof welded to the springs.

Other objects of the invention will become apparent by reference to the following detailed description and the accompanying drawings illustrating a preferred embodiment thereof, in which Fig. 1 is a plan view of the apparatus with parts broken away;

Fig. 2 is a vertical longitudinal sectional view through the apparatus taken on the line 2—2 of Fig. 1;

Fig. 3 is an enlarged fragmentary plan view of the relay component having a plurality of pairs of wires to the ends of which contacts are to be welded;

Fig. 4 is a vertical transverse sectional view through the apparatus taken on the line 4—4 of Fig. 1;

Fig. 5 is a fragmentary vertical sectional view taken on the line 5—5 of Figs. 1 and 4;

Fig. 6 is a vertical transverse sectional view through the apparatus taken on the line 6—6 of Fig. 1;

Fig. 7 is a detailed vertical sectional view taken on the line 7—7 of Fig. 6;

Fig. 8 is a plan view of a portion of the apparatus showing the holder for supporting the relay part and the aligning mechanism for laterally positioning the ends of the wire springs of the relay;

Fig. 9 is a side elevational sectional view of the structure shown in Fig. 8;

Fig. 10 is an end elevational sectional view taken on the line 10—10 of Fig. 9;

Fig. 11 is a vertical transverse sectional view taken on the line 11—11 of Fig. 1 showing the mechanism for guiding the contact tapes;

Fig. 12 is a sectional view on an enlarged scale of a portion of the mechanism shown in Fig. 11;

Fig. 13 is a fragmentary end view of the apparatus showing the mechanism for feeding the contact tapes;

Fig. 14 is an enlarged fragmentary diagrammatic view showing the relationship of the ends of the wire spring and the contact tapes to each other and the upper and lower electrodes during one portion of the welding operation;

Fig. 15 is a diagrammatic cross-sectional view taken on the line 15—15 of Fig. 1 and showing the relationship of the wire springs and the contact tapes to each other and the upper and lower electrodes;

Fig. 16 is a view similar to Fig. 15 showing the relationship of the wire springs and the contact tapes to each other and to the cutter for severing the welded contact from the tape;

Fig. 17 is an enlarged view in perspective of one of the wire springs of the relay part with a contact welded thereon; and Fig. 18 is a fragmentary vertical sectional view taken on the line 18—18 of Fig. 1.

The present apparatus is designed to weld a series of electrical contacts 15 (Figs. 3, 15 and 17) onto the ends of a row of wire springs 16 of an article or part 17 which represents a component of a wire type relay. The wires 16 are arranged in pairs in a row and are secured in a block 18 of molded insulating material, which is provided with a plurality of lugs 19 (Figs. 2, 4 and 8) for the purposes of aligning the relay component 17 with other components of the relay. The ends of the wire springs 16 are flattened to provide a flat surface onto which the contacts 15 are to be welded.

The welding apparatus comprises a metal base 20 (Figs. 1 and 2) having a dovetail guideway 22 formed therein for receiving a slide or carriage 24 on which is secured a holder 26 for supporting the part 17 thereon in a predetermined position. The holder 26 comprises a block 27 suitably secured to the slide 24 and having a flat upper surface 28 on which the block 18 of the part 17 is adapted to rest. The lugs 19 on the part 17 engage in recesses 29 in the block 27 for locating the part 17 in a predetermined position on the holder and a pair of leaf springs 30 secured to the holder 26 are adapted to engage the upper edge portions of the block 18 of the part 17 to yieldably retain it in position on the holder.

A pair of parallel inclined rods 34 secured to the block 26 of the holder and extending therefrom to the right as viewed in Figs. 1 and 2 support a member 36 for reciprocable movement thereon. An actuating rod 38 slidably supported in the block 27 for horizontal movement has a headed end 39 (Fig. 8) engaging in a T-shaped slot 40 in the member 36 to form a connection between the rod 38 and the member 36. A handle 42 (Fig. 2) on the rod 38 may be engaged to reciprocate the rod 38 and move the member 36 on the inclined rods 34 to and from a forward position shown in Fig. 2 and a retracted position shown in dotted lines in Fig. 9. As best seen in Figs. 8, 9 and 10, a pair of brackets 45—45 on the member 36 oscillatably support a shaft 46 on which is fixed an aligning member or comb 47 having a plurality of fingers 48 forming guide spaces therebetween arranged according to the spacing of the wire springs 16 for accurately positioning the ends of the wire springs 16 laterally relative to each other during the welding operation. The aligning fingers 48 have tapering end portions 50 and are adapted to be oscillated on the shaft 46 from a substantially horizontal position with the fingers 48 and the tapering portions 50 thereof disposed at a level beneath the wire springs 16 as shown in dotted lines in Fig. 9, to a vertical position shown in full line in Fig. 9 in which latter position the fingers 48 extend between the wires to accurately position them relative to each other.

Levers 52 secured to the ends of the shaft 46 are pivotally connected to a pair of links 54, which are pivotally connected to a bracket 55 extending from and forming a part of the block 27 of the holder 26. The member 36, the comb 47 and the linkage 52 and 54 are arranged in such a manner that in response to actuation of the handle 42, the comb may be moved to and from the positions illustrated in full and dotted lines in Fig. 9.

The slide 24 on which the holder 26 is fixed is provided at one end with a handle 60 (Figs. 1 and 4) having an enlarged apertured head or disk portion 61 which is pivotally secured to the slide by a headed stud 62. A spring pressed detent 63 mounted in the slide 24 engages in a groove 64 in the underside of the head 61 to yieldably maintain the handle 60 in a neutral position as shown in Fig. 1. At the other end of the slide 24 on the underneath side thereof an apertured lug 65 receives a rod 66 secured to the base plate 20 and the lug is adapted to engage shoulders 67 and 68 for limiting the travel of the slide 24.

By engaging the handle 60 the cross slide and the holder 26 may be pulled to the left as viewed in Fig. 4 to a loading position where the welded relay part may be removed and another relay part may be applied to the holder 26. With the slide 24 and the holder 26 in the loading position the handle 42 of the holder may be moved to the left as viewed in Fig. 1 to move the member 36 and the comb 47 to the position indicated in dotted lines in Fig. 9 after which the relay part 17 may be applied to the holder 26 with the lugs 19 on the part 17 fitting into the recesses 29 of the block 27 and the springs 30 yieldably retaining the part in position. After the part 17 has been properly positioned on the holder 26 the handle 42 may be pushed to the right to move the comb 47 to its operative position shown in Fig. 2, to effect the accurate lateral positioning of the wire springs 16. With the part 17 thus accurately positioned on the holder 26 the handle 60 may be pushed toward the body of the apparatus to move the slide 24 against the stop shoulder 68 to locate the holder 26 and the relay part 17 in a predetermined operating position with alternate ones of the wire springs 16 in approximate alignment with a plurality of strands or tapes 70 of contact material which are guided for advancing movement along predetermined paths in a tape feeding mechanism 72.

Aligning mechanism is provided which is operable in response to the turning movement of the handle 60 in one direction to simultaneously align the first wire spring of each of the plurality of pairs of wire springs 16 with the tapes 70 and which mechanism is operable in response to the turning movement of the handle 60 in the opposite direction to simultaneously align the second wire spring of each of the pairs of wire springs 16 with the tapes 70.

An aligning pin 75 (Figs. 1, 4 and 5) is mounted for vertical reciprocation in an aperture in the slide 24 and has a tapered lower end which is adapted to enter and seat in a tapered aperture 77 in the base 20 to accurately position the slide 24 relative to the base 20. A spring 78 bearing against the head 79 of the aligning pin 75 moves the pin 75 to its normal upper position in engagement with a cam 81 on the disk 61 and with the lower end 76 disengaged from the aligning apertures 77. The cam has a pair of sloping surfaces 83 and 84 (Fig. 5) and by turning the handle 60 to the right from the neutral position to the position 60-1 shown in dotted lines in Fig. 1, the sloping cam surface 84 moves the aligning pin 75 downwardly into engagement with the aligning recess 77, which action of the pin 75 moves the slide 24 slightly away from the stop shoulder 68 and locks the slide 24, the holder 26 and the relay part 17 in a predetermined first position to accurately align the first set of alternate wire springs 16 with the contact tapes 70.

A second aligning pin 85, similar to the aligning pin 75, is mounted for vertical movement in the slide 24 in lateral alignment with the pin 75 and is adapted to be actuated vertically by the sloping cam surface 84 in response to the turning movement of the handle 60 to and from the neutral position and position 60-2. A second tapered aligning recess 87, similar to the recess 77, is provided in the base 20 in a predetermined position relative to the aligning pin 85 for receiving the tapered lower end of the aligning pin 85 therein to locate the slide 24 in a second position for accurately aligning a second set of alternate wire springs 16 with the contact tapes 70. With the handle 60 in position 60-1 to effect the movement of the slide 24 to said first position to align the first set of alternate wire springs 16 with the contact tapes 70, the recess 87 is positioned forward of the pin 85 (Fig. 18) a distance equal to that between the first and the second wire springs of a pair of the wire springs 16 of the relay part 17, and the reduced end of the lower tapered portion of the pin 85 is disposed above and within the area of the enlarged upper end of the tapered aligning recess 87.

Thus, when it is desired to align the second set of alternate wire springs 16 with the contact tapes 70, the handle 60 is moved to the left as viewed in Fig. 1 from the position 60-1 to the position 60-2, thus causing the movement of the aligning pin 75 out of engagement with the recess 77, and causing the movement of the pin 85 into the recess 87 and the movement of the slide 24, the holder 26, and the relay part 17 to a second position to effect the accurate alignment of the second set of alternate wire springs 16 with the tapes 70.

From the above description it will be apparent that to align the first set of alternate springs 16 with the tapes 70, it is merely necessary to engage the handle 60 and move the slide 24 against the stop shoulder 68 and then move the handle 60 to the right into the position indicated at 60-1, and that to effect the alignment of the second set of alternate wire springs 16 with the contact tapes 70 the handle 60 is turned from the position 60-1 to the position 60-2.

The contact tapes 70 (Figs. 1, 11 and 12), each of which has a rib or bead 85 formed on the lower face thereof, are guided for movement in parallel guideways 86 (Figs. 2, 11 and 12) formed in a predetermined spaced relation to each other in a pair of guide blocks 87 and 88 which are made of suitable insulating material. The lower guide block 88 is stationarily supported on a pair of vertical frame members 89—89 by shouldered screws 90 and the upper block 87 is slidably supported on the block 88 and is guided for movement by the upper portion of the screws 90 which fit in slots 91 in the block 89 and guide it for movement relative to the block 89 in a direction transverse to the tapes 70. The intermediate portion of the lower surface of the guide block 87 and the upper surface of the guide block 88 are spaced apart a distance sufficient to permit the passage of the tape 70 therethrough and the guideways 86 are formed between these surfaces by ribs or rails 92 and 93 on the blocks 87 and 88, respectively, arranged in offset or staggered relation to each other and extending from one block into close proximity to the other block (Fig. 12). The rails 92 and 93 are formed as portions of metal inserts cemented into a plurality of parallel grooves formed in the blocks 87 and 88. As indicated in Fig. 12 the rails 92 and 93 normally are spaced apart to provide ample lateral clearance for the tapes 70, and the block 87 is adapted to be moved relative to the block 88 to cause the rails 92 to clamp the tapes 70 against the stationary rails 93 to accurately position the tapes in a predetermined alignment with one set of alternate wire springs 16 on the relay part 17.

To impart movement to the block 87 a bell crank lever 84 is pivotally connected thereto by a pin 85. The lower end 86 of the bell crank lever engages in a recess in the lower stationary block 88 and reacts thereagainst when the bell crank lever is actuated. A spring 97 interconnected between the bell crank lever 84 and a bracket 98 on the upper block 87 serves to rock the bell crank and move the block 87 to its normal position shown in Figs. 11 and 12, and in response to manual actuation of the bell crank 84 in a counterclockwise direction as viewed in Fig. 11 the movable block 87 is moved to the left to cause the rails 92 thereon to grip the tapes 70 against the stationary rails 93.

The contact tapes 70 are advanced by a pair of feed rolls 100 and 101 (Fig. 2) from suitable supply rolls (not shown). The roll 100 is preferably made of fibre and is provided with a plurality of grooves for receiving and guiding the contact tapes 70, and the roll 101 cooperating therewith may be formed of another slightly yieldable insulating material. Shafts 102 and 103, on which the rollers 100 and 101 are secured, are rotatably supported in the frame members 89 and have a pair of meshing gears 104–105 (Fig. 13) fixed thereto for rotating the rollers together. A worm gear 107 on the shaft 102 meshes with a worm 108 on a vertical shaft 109 which is rotatably mounted in bearings 110. Fixed to the upper end of the shaft 109 is a ratchet 113 which is engaged by a pawl 114 (Fig. 1) pivotally mounted on a disk 115 which is secured to a spur gear 116 and is mounted therewith for free rotation on the shaft 109. The gear 116 meshes with a rack 117 attached to an actuating bar 120 mounted for horizontal reciprocation in bearing members 121 and 122. A handle 124 on one end of the bar 120 which may be engaged by the operator to actuate the bar, engages the member 121 to limit the movement of the bar in one direction. A pair of adjustable collars or lock nuts 125 threadedly mounted on a reduced threaded end 126 of the bar 120 limits the movement of the bar 120 in the opposite direction.

In response to the forward stroke of the bar 120 as indicated by the arrow 127 (Figs. 1 and 13) the rack 117 rotates the gear 116 and the disk 115, the pawl 114, the ratchet 113, the shaft 109, and the worm 108 on the shaft 109 imparts a rotary movement to the worm gear 107 and the shaft 102 to effect rotation of the feed rolls 100 and 101 through a predetermined angular distance to cause the feeding movement of the set of contact tapes 70 through a predetermined distance. Thus, by setting the stops 125 in predetermined positions on the threaded end 126 of the actuating bar 120 and imparting reciprocation to the actuating bar, the tape feed mechanism 72 may be actuated to feed the tapes successively through predetermined distances.

A lower welding electrode 130 (Figs. 2 and 6) is provided having a length sufficient to support the ends of all of the wire springs 16 of the relay part 17 during the welding of contacts thereto. The electrode 130 is secured to a cross-slide or carriage 132 guided for reciprocable movement in a dovetail guideway 134 in the base 20. The upper portion of the electrode 130 is shaped to provide a relatively narrow surface of a width substantially equal to the length of the contact to be welded, for supporting the ends of the wire springs 16 thereon. Disposed above the electrode 130 for cooperation therewith are a plurality of upper, movable electrodes 137 which are mounted on the ends of elongated rods or levers 140. At the other ends thereof the bars 140 are clamped together in a hollow rectangular supporting member 142 and are maintained in spaced and insulated relation to each other and to the supporting members 142 by insulating members 143. The supporting member 142 is mounted for oscillation on a shaft 148 which is supported in a pair of brackets 149 mounted on the base 20. Thus each of the bars 140 on which the upper electrodes 137 are mounted forms a cantilever and the group of cantilevers are supported for movement together.

A plunger 151 (Fig. 2) guided in a vertical bore in the base 20 is urged upwardly by a spring 152 and serves to yieldably urge the upper electrode assembly 153 for movement upwardly in a counter-clockwise direction about the shaft 148 into engagement with an actuator member in the form of a cam 154. The cam 154 is mounted for rocking movement on the shaft 155 supported in the brackets 149 and has an operating lever 156 for imparting turning movement thereto. The cam 154 engages a hardened metal wear member 158 on the pivoted supporting member 142 and in response to turning movement of the lever 156 and in cooperation with the spring pressed plunger 151 the cam serves to move the upper electrode unit 153 to and from an open position with the electrodes 137 spaced a substantial distance from the lower electrode 130 and a closed position with the electrodes 137 in engagement with the contact tape 70 as shown in Fig. 2. The cantilevers 140 are sufficiently flexible so that when the handle 156 is turned to its operative position indicated in Fig. 2, the cantilevers 140 are flexed and impart a predetermined pressure to the electrodes 147 and in response to the passing of a welding current through the electrodes the flexed levers impart a follow-up movement to the electrodes 137 as the ribs 82 on the contact tapes 70 fuse and the tapes move toward and are welded to the wire springs 16.

Individual flexible conductors 158 (Fig. 2) attached to the levers 140 electrically connect the electrodes 137 individually to a welding circuit (not shown) and the electrode 130 is electrically connected to the welding apparatus by a conductor 159 (Fig. 6).

From the description of the apparatus thus far it will be seen that with the slide 24 and the holder 26 in their forward or loading position and the comb 47 in its retracted position, a relay part 17 may be applied to the holder after which the handle 42 may be actuated to move the comb from the dotted line to the full line position as shown in Fig. 9 to laterally position the ends of the wire springs 16 in proper laterally spaced relation to each other. By engaging the handle 60, the slide 24 with the holder 26 and the relay part 17 thereon is then advanced to its operative position shown in Fig. 1 after which the handle 60 is turned in the right-hand direction to the position 60–1 (Fig. 1) to cause the actuation of the aligning pin 75 to effect the alignment of one set of alternate wire springs 16 with the tape 70. During the movement of the slide 24 from its loading position to its operative position the ends of the wire springs 16 will ride over and rest on the upper surface of the lower electrode 130.

After the relay part 17 has been positioned with the ends of the first set of wires 16 aligned with the contact tapes 70 the actuating bar 127 of the tape feed mechanism is reciprocated to feed the tapes 70 and advance a predetermined portion of the ends thereof over the ends of the wire spring 16 aligned therewith. The upper electrode actuating lever 156 is then actuated to cause the upper electrode unit 153 to be moved to its closed position and to flex the cantilevers 140 and apply a predetermined pressure through the electrodes 137 to press the ends of the tapes 70 onto the ends of the wire springs 16 and clamp them between the electrodes 137 and 130 during the welding operation. A welding current is then passed through the electrodes 137 and 130 to cause the welding of the ends of the tapes 70 onto the ends of the wire spring 16 on completion of which the handle 156 is actuated to effect the movement of the upper electrode assembly to its open position.

For severing the welded portion of the contact tapes 70 from the rest of the tape there is provided a cutter 169 (Figs. 1, 6 and 16) which comprises a pair of relatively movable cutter blades 170 and 171 adapted to be moved into close proximity to the ends of the wire springs 16. The lower cutter blade 170 is fixed to a supporting member 173 which is mounted on the cross slide 142 for movement therewith. The upper blade 171 is mounted for oscillatable movement about a pivot 175 on the supporting member 173 and has a rearwardly extending portion 177 to which a spring 178 is secured for stressing the upper blade 171 for rotation to its normally open position. The blade 171 is adapted to be moved relative to the blade 170 by actuating mechanism including a rod 180 which engages the rearwardly extending portion 177 of the blade 171 and is actuated by a lever 181 fixed to a shaft 182. The shaft 182 which passes through a clearance aperture in the base 20 is mounted for rocking movement in bearing members 183 and 184 carried by the cross slide 132 and has a handle 185 by means of which the shaft may be oscillated to actuate the cutter.

The handle 154 also serves as means by which the slide 132 may be reciprocated. The movement of the slide 132 away from the operator to position the lower electrode 130 under the contact tapes 70 is arrested in a predetermined position by the engagement of the bearing 183 with a boss or collar 187 on the base 20 and the movement of the slide 132 in the opposite direction is arrested by the engagement of the lever 181 with a boss or collar 188 on the base 20 to position the cutter blades 170—171 in cutting position on opposite sides of the tapes 70.

After each welding operation as the sets of contacts are welded onto the wire springs 16 of the relay part 17, the upper electrode actuating handle 156 is actuated to release and effect the raising of the upper electrodes 137 after which the handle 185 is engaged and the slide 132 is pulled forwardly toward the operator to remove the lower electrode 130 from under the contact tapes 70 and to move the cutting blades 170 and 171 into cutting position on opposite sides of the contact tapes 70. When the cutter 169 is in operative position for severing the contact tapes, the blade 170 thereof is positioned underneath the tapes 70 and in close proximity to the ends of the wire springs 16 (Fig. 16). With the cutters 169 in operative position the handle 185 may be rotated to cause the actuation of the upper cutter 171 to shear the tapes 70 adjacent the ends of the wire springs 16 to sever the welded contacts 15 on the ends of the wire springs 16 from the contact tapes 70. Upon completion of the tape shearing operation the slide may be returned to its other position to again locate the lower electrode 130 beneath the ends of the wire springs 16 preparatory to the next welding operation.

Upon completion of the welding of the first set of contacts of the two sets of alternate wire springs of the relay component 17 and the severing of the contacts from the tapes, the lever 60 on the slide 24 is turned to the left to the position 60–2 (Fig. 1), as stated before, to cause the alignment of the ends of the second set of alternate wire springs 16 with the tapes 70 after which the tapes 70 are advanced and welded to the wire springs and the welded contacts severed from the tapes in the same manner as described before. Thus, with the present apparatus contacts may be welded onto the ends of a plurality of closely arranged wire springs in two welding operations as described hereinbefore.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. In a device for welding a contact onto a part, the combination of a base, means on said base for supporting a part in a welding position, means for feeding the end portion of a tape of contact material onto said part, a first electrode, a pair of relatively movable cutting tools, a carrier on said base mounting said cutting tools and said first electrode in spaced relation to each other for movement to and from a first position with the electrode in engagement with said part and with the cutting tools removed therefrom and a second position with the cutting tools adjacent said part and on opposite sides of the ribbon and with the first electrode removed therefrom, a second electrode mounted for movement toward and away from the first electrode when said first electrode is in said first position, means for actuating said second electrode to compress the tape and the part between the electrodes, means for actuating said carrier to and from said first and second positions, and means for actuating said cutting tools to sever from the tape the contact forming portion thereof welded to said part.

2. In a device for welding a contact onto a part, the combination of means for supporting said part in a predetermined position, a first electrode, cutting means, a carrier mounting said cutting means and said first electrode in spaced relation to each other for movement to and from a first position with the electrode in alignment with said part and with the cutting means removed therefrom and a second position with the cutting means in alignment with said part and said electrode removed therefrom, means for feeding the end portion of a tape of contact material onto the end portion of said part, a second electrode, means for actuating said second electrode to compress the tape and the part between the electrodes, means for actuating said carrier to and from said first and second positions, and means for actuating said cutting means to sever from the tape the contact forming portion thereof welded to said part.

3. In a welding apparatus having means for supporting the ends of a plurality of contact springs on a relay component in a predetermined spaced relation to each other, means for feeding a plurality of contact tapes onto the ends of said contact springs, and a plurality of relatively movable electrodes for welding the contact tapes to the contact springs, the combination therewith of a pair of relatively movable members having a pair of opposed parallel spaced surfaces providing clearance for the passage of the tapes of contact material therethrough onto the contact springs and having a plurality of ribs extending from said surfaces in interfitting relation to each other to form a plurality of parallel guideways for said tapes, said ribs having surfaces engageable with the sides of the tapes for clamping said tapes therebetween, means for supporting said members for relative movement of the members, means for effecting the relative movement of said members to and from a first position in which said tape contacting surfaces are spaced apart to provide clearance for the movement of the tapes therebetween and to and from a second position with said surfaces in gripping engagement with said tape to position said tapes in predetermined alignment with said contact springs.

4. In a welding apparatus having means for supporting the ends of a plurality of contact springs on a part in a predetermined spaced relation to each other, means for feeding a plurality of tapes of contact material onto the end portions of said contact springs, and a plurality of relatively movable electrodes for welding the tapes to the springs, the combination therewith of a supporting member having a plurality of parallel grooves therein for guiding said tapes for movement onto said springs, each of said grooves having a bottom wall for supporting said tapes and an upwardly extending gaging wall against which said tapes are adapted to be pressed for positioning said tapes in a predetermined alignment with said springs, a plurality of presser elements disposed in said grooves for pressing said tapes against said gaging walls, means supporting said elements for movement laterally of said grooves, resilient means urging said elements away from said gaging walls to a normal position to provide clearance for the movement of said tapes through said grooves, and means for moving said elements toward the gaging walls of said grooves to clamp said tapes thereagainst.

5. In an apparatus for welding contacts onto the ends of a plurality of wire springs extending in parallel relation to each other from a body member of a relay component, the combination of a holder having portions thereof engageable with the body member of said relay component for supporting said relay component in a predetermined position with the wires extending substantially horizontally therefrom, a comb member having a plurality of fingers forming slots arranged in spaced relation to each other corresponding to the spacing of said wires on said relay component, means mounting said comb member with the slots therein in alignment with the wires in the relay component on said holder and for movement relative to said holder vertically parallel to the wires to and from a first position adjacent said body member and a second position near the ends of said wires, means for raising said comb as it travels from said first position to said second position, the comb in said first position having the fingers thereon disengaged from said wires and in said second position having the fingers engaging said wires to position the wires in said predetermined laterally spaced relation to each other.

6. In an apparatus for welding contacts onto the ends of a row of wire springs extending in parallel relation to each other from a body member of a relay component, the combination of a base, a holder having portions thereof engageable with the body member of said relay component for supporting said component in a predetermined position with the springs extending substantially horizontally therefrom, electrode means including a lower electrode in spaced relation to said holder and engageable with the end portion of said spring for supporting said end portions, means on said base for feeding a plurality of tape of contact material above said electrode member and onto the end portions of said springs, a comb member having a plurality of fingers forming slots arranged in spaced relation to each other corresponding to the spacing of said wires on said relay component, and means for moving said comb to and from a first position adjacent the body member of a relay component on said holder and a second position adjacent the lower electrode and the ends of the springs of said component and for moving said comb transversely of said springs to effect the disengagement of the comb from said springs at said first position and the engagement of the comb with said springs at said second position to laterally space the ends of the wire springs in a predetermined relation to each other and the tapes.

7. In an apparatus for welding contacts onto the ends of a plurality of wire springs extending in parallel relation to each other from a body member of a relay component, the combination of a holder having portions thereof engageable with the body member of said relay component for supporting said relay component in a predetermined position with the wires extending substantially horizontally therefrom, a comb member having a plurality of fingers forming slots arranged in spaced relation to each other corresponding to the spacing of said wires on said relay component, a carrier, means pivotally mounting said comb on said carrier for movement from a substantially horizontal position with the finger disposed below said wires and a substantially vertical position with the fingers engaging between said wires to laterally space said wires in a predetermined relation to each other, means on said holder for guiding said carrier for movement toward and away from said holder, means for moving said carrier to and from a first position with the comb positioned adjacent the member of said relay component and a second position with a comb positioned adjacent the ends of the wires on said relay component, and means operable in response to the movement of said carrier for oscillating said comb to and from a horizontal position at said first position and a vertical position at said second position.

8. In a welding apparatus for welding contacts onto a plurality of wire springs arranged in a row in lateral and parallel relation to each other on a relay component, the combination of a base, a lower electrode mounted on said base for supporting the end portions of the springs thereon, means for feeding a plurality of tapes in spaced relation to each other over said electrode and the end portions of alternate ones of some of the springs positioned thereon, the spacing of said tape being equal to the spacing between alternate springs on said relay component, a plurality of movable electrodes arranged relative to each other corresponding to the spacing of said tapes and alternate ones of said wire springs, means mounting said upper electrode for movement toward and away from said lower electrode and in alignment with the tapes, a holder for supporting a relay component with the ends of the springs supported on said lower electrode, a slide on said base for supporting said holder and the relay component thereon for movement, a handle pivotally mounted on said slide having a first neutral position and operable in said first neutral position for moving said slide to and from a loading position and an operable position with the contact springs of said relay component in approximate alignment with said tapes, a first aligning means including a tapered aligning pin on said slide cooperable with a tapered aligning aperture in said base operable in response to the turning movement of said handle in one direction to a second position for positioning said holder to accurately align one set of alternate springs with said tapes, and a second aligning means including a tapered pin on said slide cooperable with a tapered recess in said base and operable in response to the turning movement of said handle in another direction to a third position for positioning said holder to accurately align the other set of alternate springs with said tapes.

9. In a welding apparatus for welding contacts onto a plurality of wire springs arranged in a row in lateral and parallel relation to each other in a relay component, the combination of a base, a lower electrode mounted on said base for supporting the ends of the wire springs thereon, a plurality of upper electrodes spaced apart relative to each other corresponding to the spacing of alternate ones of said wire springs, means for feeding a plurality of tapes onto alternate ones of said wire springs, means for moving the upper electrodes to and from said lower electrode and in predetermined alignment with the tapes, a holder on said base for supporting a relay component with the ends of the springs supported on said lower electrode, means for moving said holder to and from two predetermined positions to successively align each of the sets of alternate wire springs with the tapes and the movable electrodes, and means for shearing the tapes adjacent the ends of said springs to sever from the tapes the contact forming portions thereof welded to the springs.

10. In a welding apparatus for welding contacts onto a plurality of wire springs arranged in a row in lateral and parallel relation to each other on a relay component, the combination of a lower electrode for supporting the ends of the contact springs thereon, a plurality of upper electrodes movable toward and away from said lower electrode and arranged in spaced relation to each other corresponding to the spacing of alternate ones of said wire springs, means for feeding a plurality of tapes in predetermined spaced relation to each other onto alternate ones of said wire springs in alignment with said upper electrodes, means for supporting said lower electrode said movable electrodes and the feed means in a predetermined relation to each other, a holder for supporting a relay component with the ends of the contact springs supported on said lower electrode, means mounting said holder and said supporting means for relative movement, and means for effecting relative movement between said holder and said supporting means to and from two positions to successively align each of the sets of alternate wire springs with the tapes and the movable electrodes.

11. A welding apparatus for welding contacts onto a plurality of pairs of wire springs arranged in a row in parallel relation to each other on a relay component comprising a base, a lower electrode mounted on said base for supporting the end of the springs thereon, means for feeding a plurality of tapes in spaced relation to each other over said electrode and the ends of one of each pair of the contact springs positioned thereon, the spacing of said tape corresponding to the spacing of alternate springs on said relay component, a plurality of upper movable electrodes arranged relative to each other corresponding to the spacing of said tapes, means for actuating said upper electrodes for movement toward and away from said lower electrode and the tapes, a holder for supporting a relay component with the ends of the contact springs supported on said lower electrode, means for supporting said holder and the relay component thereon for movement on said base including a handle, a first aligning means including a tapered aligning pin on said supporting means cooperable with a tapered aligning aperture in said base operable in response to the turning movement of said handle in one direction for accurately aligning one of the springs of each pair of springs with said tapes, and a second aligning means including a tapered pin on said supporting means cooperable with a tapered recess in said base operable in response to the turning movement of said handle in another direction for accurately aligning the other spring of each pair of springs with said tapes.

12. A welding apparatus for welding contacts onto a plurality of springs arranged in a row in parallel relation to each other on a relay component, the combination of a base, a lower electrode mounted on said base for supporting the end portions of the springs thereon, means for feeding a plurality of tapes in spaced relation to each other over said electrode onto the end portions of alternate ones of some of the springs positioned thereon, the spacing of said tape corresponding to the spacing of alternate springs on said relay component, a plurality of upper movable electrodes spaced apart corresponding to the spacing of alternate springs, means mounting said upper electrode for movement toward and away from said lower electrode and in alignment with the tapes, a holder for supporting a relay component with the ends of the springs supported on said lower electrode, means mounting said holder for movement on said base, means including a handle operable to move the holder to a first position in response to the movement of said handle to one position to align one set of alternate springs on the component with the tapes and to move said holder to a second position in response to the movement of said handle to another position to align the other set of alternate springs with the tapes, and means for shearing the tapes to sever the portions thereof welded to the springs from the tapes.

13. In a welding apparatus for welding contacts onto a plurality of contact springs arranged in a row in lateral and parallel relation to each other in a relay component, the combination of a base, a lower electrode mounted on said base for supporting the ends of the contact springs thereon, a plurality of upper electrodes spaced apart relative to each other corresponding to the spacing of alternate ones of said contact springs, means for feeding a plurality of tapes onto alternate ones of said contact springs, means for moving the upper electrodes to and from said lower electrode and in predetermined alignment with the tapes, a holder on said base for supporting a relay component with the ends of the springs supported on said lower electrode, and means for moving said holder to and from two predetermined positions to successively align each of the sets of alternate contact springs with the tapes and the movable electrodes.

14. A welding apparatus for welding contacts onto a plurality of springs arranged in a row in parallel relation to each other on a relay component, the combination of a base, a lower electrode mounted on said base for supporting the end portions of the springs thereon, means for feeding a plurality of tapes in spaced relation to each other over said electrode onto the end portions of alternate ones of some of the springs positioned thereon, the spacing of said tape corresponding to the spacing of alternate springs on said relay component, a plurality of upper movable electrodes spaced apart corresponding to the spacing of alternate springs, means mounting said upper electrode for movement toward and away from said lower electrode and in alignment with the tapes, a holder for supporting a relay component with the ends of the springs supported on said lower electrode, means mounting said holder for movement on said base, and means including a handle operable to move the holder to a first position in response to the movement of said handle to one position to align one set of alternate springs on the component with the tapes and to move said holder to a second position in response to the movement of said handle to another position to align the other set of alternate springs with the tapes.

15. In an apparatus for welding contacts onto a plurality of springs of a relay part, the combination of a base, a lower relatively wide electrode, means on said base for supporting a relay part with the ends of the springs thereof on said lower electrode, means for feeding the end portions of a plurality of tapes of contact material above said lower electrode and onto the ends of said relay springs, a plurality of levers, a plurality of upper electrodes connected to the ends of said levers, a holder disposed in spaced relation to said electrodes for supporting said levers in insulated relation to each other, means on said base for mounting said holder for movement to guide said upper electrodes toward and away from said lower electrode, means for actuating said holder to move said upper electrodes into engagement with the tapes to press the tapes against the ends of the springs with a predetermined pressure and to flex said levers to effect a quick follow-up of the movement of said electrodes as said contact tapes are welded to the springs, a pair of relatively movable cutting tools, carrier means on said base mounting said cutting tools and said lower electrode in spaced relation to each other for movement to and from a first position with the lower electrode in engagement with the springs of said relay part and with the cutting tools removed therefrom and to and from a second position with the cutting tools adjacent the ends of said springs and on opposite sides of said plurality of tapes and the lower electrode removed therefrom, means for actuating said carrier means to and from said first and said second positions, and means for actuating said cutting tool to sever the welded portion of the contact tape from the tapes.

16. In an apparatus for welding contacts onto a plurality of contact springs arranged in a row in lateral parallel relation to each other in a relay part, a combination of a base, a lower electrode mounted on said base, a holder on said base for supporting a relay part with the ends of the springs supported on said lower electrode, a plurality of levers capable of being flexed under a predetermined pressure and having upper electrodes mounted on one end thereof, means for supporting said levers in spaced and insulated relation to each other and for pivotal movement for guiding the upper electrodes through a predetermined path toward and away from said lower electrode, said upper movable electrodes being spaced apart relative to each other corresponding to the spacing of alternate ones of said contact springs, means for feeding a plurality of tapes onto alternate ones of said contact springs in alignment with said upper electrodes, means for actuating said levers to move said upper electrodes into engagement with the tapes to press said tapes against the ends of the springs with a predetermined pressure and to flex said levers to effect a quick follow-up of the movement of said electrodes as said contact tapes are welded to the springs, means for moving said holder with the relay part therein to and from predetermined positions to successively align each of the sets of alternate contact springs with the tapes and the movable electrodes, and means for shearing the tapes adjacent the ends of said springs to sever from the tapes the welded contact forming portions thereof.

17. In an apparatus for welding contacts onto a plurality of contact springs arranged in a row in lateral parallel relation to each other in a relay part, a combination of a base, a lower electrode mounted on said base, a holder on said base for supporting a relay part with the ends of the springs supported on said lower electrode, a plurality of levers capable of being flexed under a predetermined pressure and having upper electrodes mounted on one end thereof, means for supporting said levers in spaced and insulated relation to each other and for pivotal movement for guiding the upper electrodes through a predetermined path toward and away from said lower electrode, said upper movable electrodes being spaced apart relative to each other corresponding to the spacing of alternate ones of said contact springs, means for feeding a plurality of tapes onto alternate ones of said contact springs in alignment with said upper electrodes, means for actuating said levers to move said upper electrodes into engagement with the tapes to press said tapes against the ends of the springs with a predetermined pressure and to flex said levers to effect a quick follow-up of the movement of said electrodes as said contact tapes are welded to the springs, means for moving said holder with the relay part therein to and from predetermined positions to successively align each of the sets of alternate contact springs with the tape and the movable electrodes, a pair of relatively movable cutting tools, carrier means on said base mounting said cutting tool and said lower electrode in spaced relation to each other for movement to and from a first position with the lower electrode in engagement with the springs of said relay part and with the cutting tools removed therefrom and to and from a second position with the cutting tools adjacent the ends of said springs and on opposite sides of said tapes, means for actuating said carrier means to and from said first and said second positions, and means for actuating the cutting tools to sever portions of the contact from the tapes.

References Cited in the file of this patent

UNITED STATES PATENTS

| Number | Name | Date |
|---|---|---|
| 2,316,597 | Kershaw | Apr. 13, 1943 |
| 2,339,884 | Schlumpf | Jan. 25, 1944 |
| 2,460,807 | Chanowitz | Feb. 8, 1949 |
| 2,474,340 | Warner | June 28, 1949 |